INVENTOR
CHARLES C. PERRY

BY
Olsen and Stephenson
ATTORNEYS

United States Patent Office 3,483,360
Patented Dec. 9, 1969

3,483,360
THERMOSTATIC SWITCHING DEVICE AND OVERHEAT CONTROL SYSTEM INCORPORATING SAME
Charles C. Perry, Ann Arbor, Mich., assignor to W. M. Chace Company, Detroit, Mich., a corporation of Delaware
Filed July 11, 1967, Ser. No. 652,437
Int. Cl. H05b 1/02; H01h 37/46
U.S. Cl. 219—512                    2 Claims

ABSTRACT OF THE DISCLOSURE

A thermostatic electric switching device utilizing a memory wire of predetermined length and formed of a metal alloy consisting substantially of nickel and titanium originally formed at a critical temperature and subsequently plastically deformed to a certain length. Such a memory wire remembers the critical temperature at which it was formed, and when it is subsequently heated to that temperature it will suddenly decrease in length. This sudden decrease in length is utilized to open a switch. An overheat control system for an electric resistance heater has the memory wire located in proximity to the heater so that in the event any section of the heater overheats, the memory wire is heated to its critical temperature resulting in the sudden reduction of length and opening of the switch to the resistance heater. A safety switch associated with the memory wire opens, so as to open the circuit to the resistance heater, in the event the wire is broken or removed.

BACKGROUND OF THE INVENTION

Safety requirements presently in effect in connection with electric resistance heaters of the type commonly used in room baseboards and the like for room heating purposes require that the resistance heater be automatically shut off in the event any section of the length thereof becomes overheated. In the past, this has required a gas filled tube to be positioned along the length of the resistance heater. A whole series of thermally responsive bimetallic elements could also be positioned along the length of the resistance heater. Both of these solutions to the overheat shut-off problem are inadequate for obvious reasons.

SUMMARY OF THE INVENTION

This invention provides a thermostatic snap acting electric switching device which utilizes memory wire characterized by the fact that the wire is formed at a critical temperature corresponding to the critical temperature at which the electric resistance heater must be shut off in case of overheating. This temperature is specified in each case by safety control groups such as Underwriter Laboratories. The memory wire can then be plastically deformed at the lower operating temperature of the resistance heater to obtain a predetermined length of the wire. At the critical temperature, the wire will suddenly return to its original length. This sudden return can be utilized to obtain action of a switch associated with the heater to discontinue operation of the heater.

It is an object of this invention, therefore, to provide an improved thermostatic electric switching device and overheat control system incorporating this device.

Further objects, features and advantages of this invention will become apparent from a consideration of the following description, the appended claims, and the accompanying drawing in which:

Figure 1:
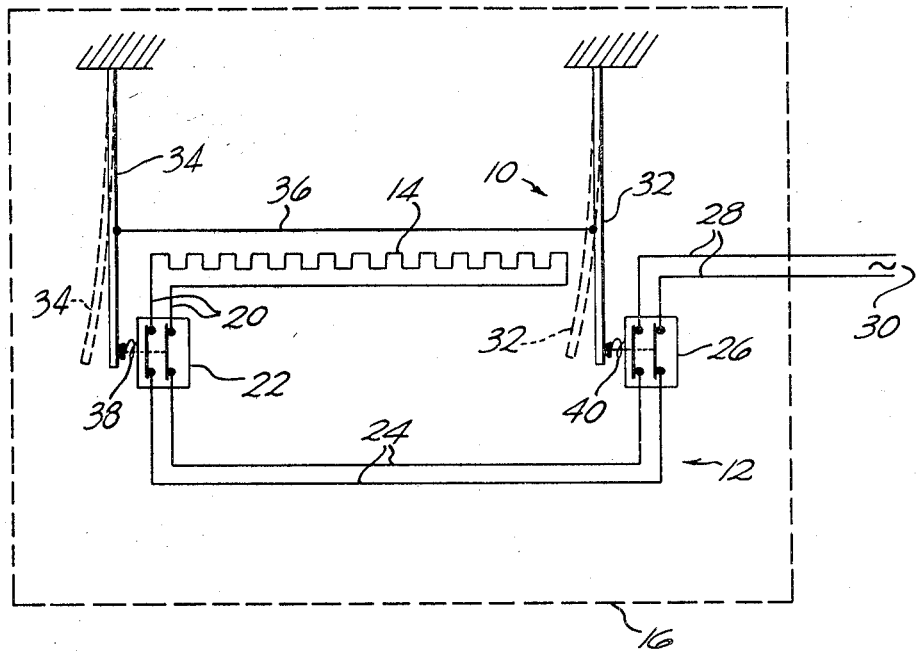
FIGURE 1 is a schematic view of an electric resistance heater showing the overheat control system of this invention in assembly relation therewith.
Figure 3:
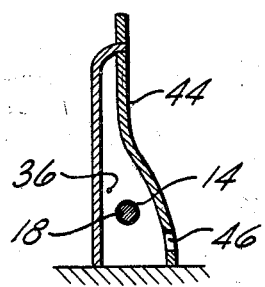
FIGURE 3 is a transverse sectional view of the baseboard showing a heater and a thermostatic element of this invention mounted therein, as seen from substantially the line 3—3 in FIG. 2.

With reference to the drawing, the thermostatic switching device of this invention, indicated generally at 10, is illustrated in FIG. 1 in an overheat control system 12 for an electric heater 14, of resistance type, disclosed in an enclosure indicated at 16. The heater element 14 is of the type that is usually wrapped around a center core 18, as shown in FIG. 3, and connected to a pair of conductors 20. The conductors 20 are connected to a first double contact safety switch 22 which is in turn connected by conductors 24 to a double contact shutoff switch 26 which is connected by conductors 28 to a source 30 of current.

The switching device 10 includes a first spring support element 32 which is stressed so that it tends to move to the right as viewed in FIG. 1, a second spring support element 34 stressed so that it tends to move to the left in FIG. 1, and a length of memory wire 36 connected to and extended between the supports 32 and 34. The memory wire 36 is formed, in one embodiment of the invention, from a metal alloy consisting essentially of nickel and titanium, this alloy being known as nitinol, the name used to typify the generic class of alloys ranging in composition from 56 to 62 weight percent Ni, balance Ti. A wire, such as the wire 36, formed from this material is characterized by its inherent ability to suddenly return to the length at which it was formed in the fabricating process, when heated to the critical temperature at which such forming took place. In other words, a nitinol wire can be plastically deformed at temperatures below its critical temperature, namely, the temperature at which the wire was fabricated and when the wire is heated to its critical temperature, it will suddenly return to its original length.

In the switching device 10, the spring support 32 will, in the absence of a counteracting force thereon, engage the shutoff switch 26 so as to hold it closed. The spring support 34 will, on the other hand, assume a position in which the switch 22 is allowed to open, in the absence of a counteracting force on the support 34. The wire 36 is connected to the supports 32 and 34, the support 32 applying sufficient spring force to the wire 36 to plastically deform the wire 36 to the length shown in FIG. 1. In this position, the wire 36 will not apply sufficient force to the spring support 32 to move it away from its switch closing position shown in solid lines in FIG. 1 but it will hold the spring support 34 in its switch closing position shown in solid lines in FIG. 1. In other words, the spring force in the support 32 and the strain force in the wire 36 are in equilibrium when the wire 36 is below its critical temperature, as shown in solid lines in FIG. 1. The switch 22 is biased, such as by spring 38 toward an open position, and the switch 26 is similarly biased such as by a spring 40 to a switch open position. In the event any portion of the wire 36 is heated to a temperature at or above the above-described critical temperature, the wire 36 will suddenly decrease in length by an amount sufficient to pull the spring support 32 toward its broken line position shown in FIG. 1 to thereby allow the shutoff switch 26 to open. In the event the wire 36 is cut or removed, the spring support 34 will move to its broken line position allowing the safety switch 22 to open.

Figure 2:
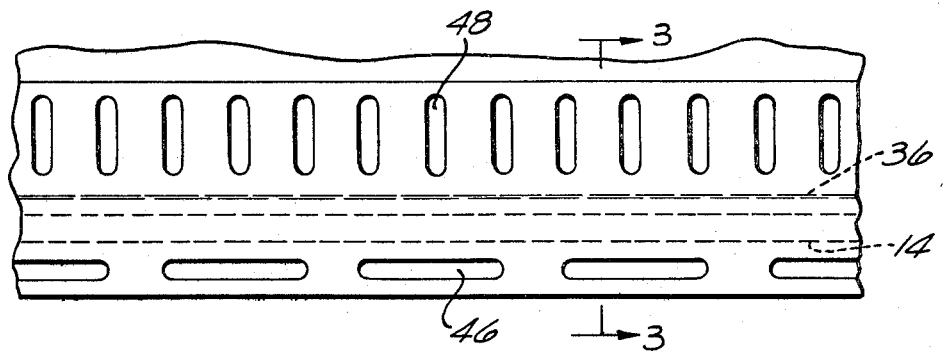
FIGURE 2 is a fragmentary front view of a baseboard heating system utilizing the heater and control system shown in FIG. 1.

In one embodiment of the invention, the heater element 14 is disposed in an enclosure 42 formed by a baseboard 44 having air inlet openings 46 and air outlet openings 48, as shown in FIGS. 2 and 3. The memory wire 36 is positioned adjacent the heating element 14. The wire 36 is then connected to and extended between the spring supports 32 and 34 as shown in FIG. 1. In the event any section of the heater element 14 becomes overheated, which could be caused by a drape or the like falling across the openings 46 and/or 48 opposite one section of the heater element 14, the memory wire 36 would become similarly heated. As soon as the memory wire 36 reaches its critical temperature, corresponding to the safety temperature which the heater element 14 must not exceed, the element 36 will immediately decrease in length thereby applying a pulling force to the spring element 32 so as to release the switch 26 for movement to an open position. This opens the circuit to the heater element 14 so as to disconnect it. As soon as the wire 36 has cooled to a temperature below its critical temperature, the spring support 32 will re-stretch the wire 36 so as to return it to its solid line position shown in FIG. 1, and the support 32 will reclose switch 26 so that operation of heater 14 is resumed. If the condition causing overheating persists, the cycle is repeated. In the event the wire 36 should become cut, the spring support 34 will immediately move to its broken line position allowing the safety switch 22 to open and also disconnect the heater element 14.

From the above description it is seen that this invention provides a thermostatic electric switching devcie 10 characterized by its extreme simplicity and reliability in opening the switch 26 in the event of heating to a critical preselected temperature. It is to be understood that the wire 36 can be formed within a wide range of temperatures so as to obtain thermostatic action of the wire at a desired critical temperature. In the control system 12, the memory wire is effective to disconnect the heater element 14 in the event of overheating and provide for operation of the heater element 14 only when both switches 22 and 26 are closed. Thus, an extremely simple and reliable control is provided for the heater element 14.

It will be understood that the thermostatic electric switching device and overheat control system utilizing same which are herein disclosed and described are presented for purposes of explanation and illustration and are not intended to indicate limits of the invention, the scope of which is defined by the following claims.

What is claimed is:
1. A thermostatic switching device responsive to ambient temperature to supply electric current to an electric heater when said temperature falls below a selected critical value and to interrupt the supply of current to said heater when said temperature is at least equal to said value, said device comprising:
first and second physically separated electrical switches, each switch having alternative open and closed positions, the first switch being normally open, the second switch being normally closed;
means electrically connecting both switches in series between the heater and the current source whereby said heater receives current only when both switches are closed, the current flow being interrupted when at least one switch is open; and
an elongated temperature responsive member having a first length at temperatures below said critical value and having a second and smaller length at temperatures at least equal to said value, said member being connected to and between said switches to maintain both switches closed at temperatures below said critical value and to open the second switch at temperatures at least equal to said critical value, said first switch opening automatically when the member is severed or removed.
2. A device as set forth in claim 1 wherein said member is a nitinol wire.

References Cited

UNITED STATES PATENTS

| 2,487,268 | 11/1949 | Oleson | 219—512 |
| 3,294,941 | 12/1966 | Mullen | 200—143 |
| 3,254,180 | 5/1966 | Flanagan | 337—140 |
| 3,127,760 | 4/1964 | Kirkpatrick et al. | 73—1 |

BERNARD A. GILHEANY, Primary Examiner

F. E. BELL, Assistant Examiner

U.S. Cl. X.R.

337—123, 383